Patented July 9, 1946

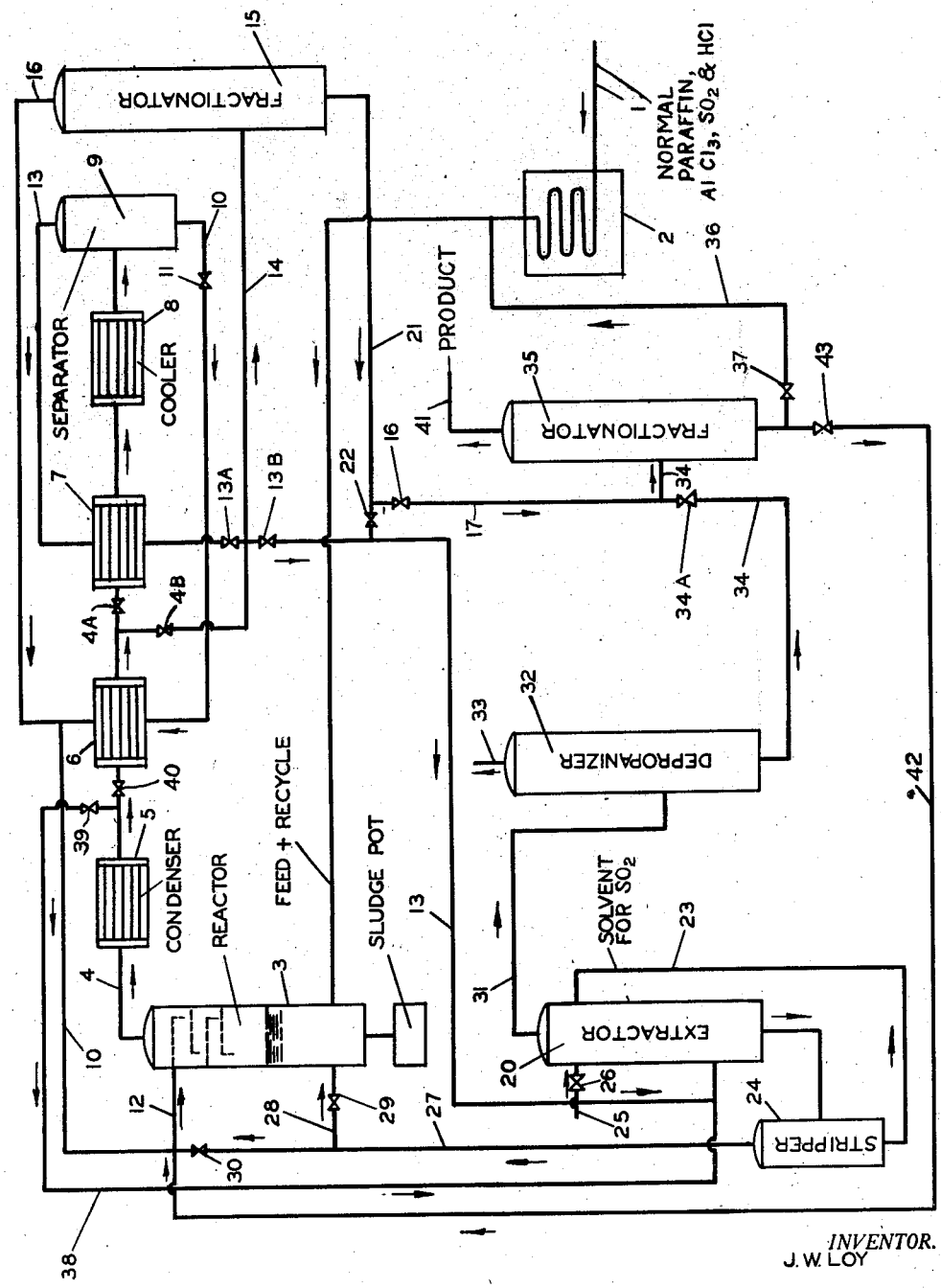

UNITED STATES PATENT OFFICE 2,403,811

ISOMERIZATION OF HYDROCARBONS

John W. Loy, Bartlesville, Okla., assignor to Phillips Petroleum Company, a corporation of Delaware Application October 5, 1942, Serial No. 460,798

1 Claim. (Cl. 260—683.5)

This invention relates to an improved process for the production of branched chain or iso-hydrocarbons from the normal or straight chain hydrocarbons with aluminum halide catalysts, and is more specifically concerned with a process for contacting normal paraffin hydrocarbons with aluminum halide in solution and under suitably controlled conditions of temperature and pressure conducive to catalytic isomerization.

It is known that hydrocarbons, especially the straight chain paraffins, may be isomerized in the presence of aluminum halide catalysts, particularly aluminum chloride and aluminum bromide, in solid form with or without a hydrogen halide catalyst promoter into branched chain hydrocarbons having remarkably improved physical and chemical characteristics. As a general rule hydrocarbons having a highly branched molecular structure are known to possess improved octane response over the related straight chain compounds and likewise are extremely valuable constituents in the production of higher molecular weight compounds by alkylation. A major problem, however, encountered in the execution of such processes is found particularly in handling aluminum halide catalysts, for example aluminum chloride which may be employed either as a solid or in the form of a slurry. At the elevated temperatures required for isomerization, sublimation occurs, followed by carryover of the sublimed material with the overhead effluent containing the isomerization product and consequent condensation and plugging of columns, lines and other equipment utilized in the process. Considerable delay is thereupon occasioned in shutting down operation of the unit for removal of the solidified catalytic material. A further difficulty encountered in the operation of such processes is the deterioration of equipment due to the highly corrosive and/or erosive action of the aluminum halide on metals, necessitating periodic and costly replacements.

The present invention provides a solution to the problems heretofore encountered in isomerization processes involving aluminum halide catalysts by the use of a solvent for the aluminum halide and by performing the reaction under isomerizing conditions with a reflux of hydrocarbon or solvent, or both, thus providing a vapor-liquid interchange in the reaction zone and returning vaporized aluminum halide to the liquid reaction mixture. A preferred aluminum halide solvent is liquid sulfur dioxide, although other suitable solvents may be employed.

In performing the isomerization process in accordance with this invention the reaction mixture including a straight chain hydrocarbon such as normal butane in admixture with a solution of aluminum chloride in sulfur dioxide and preferably a catalyst promoter such as hydrogen chloride, preheated to isomerizing temperature, is introduced into the reaction zone and isomerization permitted to proceed under a suitable pressure in a fractionator or other column provided with means for effecting maximum contact between reflux liquid and gases including aluminum chloride vapor, hydrocarbons and hydrochloric acid vapor. The reflux liquid may be obtained simply by means of a cooling section in the upper portion of the column, or preferably consists of sulfur dioxide, with or without butane and hydrochloric acid, recycled from a separation zone. The utilization of liquid sulfur dioxide as a solvent for the aluminum chloride and as a reflux in the reaction zone entirely prevents the passage of aluminum chloride vapors into the overhead product and eliminates the erosion of equipment within the reaction zone itself. The solution of aluminum chloride likewise facilitates maximum contact with the hydrocarbons in the reaction zone.

Referring to the apparatus diagrammatically illustrated in the drawing, a liquid feed stock comprising straight chain paraffin hydrocarbons, aluminum chloride catalyst in liquid sulfur dioxide, and anhydrous hydrogen chloride catalyst promoter, is fed through a conduit 1 and preheater 2 into the base of reactor 3 which is shown as a fractionator provided at the top with a number of trays. Temperatures and pressures within the reaction zone conducive to catalytic isomerization are maintained and an overhead effluent of the isomerized product, straight chain hydrocarbons, sulfur dioxide and catalyst promoter, if one be employed, passes through conduit 4 to condenser 5. From condenser 5 the mixture passes through heat exchangers 6 and 7 to a refrigeration unit 8 for cooling to a stratification temperature, if the hydrocarbon feed is one capable of forming an azeotropic mixture with sulfur dioxide, for example, as in the case of butane. The mixture then passes to separator 9 wherein a liquid phase separation takes place, the fraction predominating in sulfur dioxide being withdrawn from the bottom through conduit 10, valve 11, and passed through heat exchanger 6 to cool the effluent from line 4, and thereafter introduced into reactor 3 through conduit 12 for reflux and entrainment of vapors in the reaction zone. The upper layer from separator 9 comprising most of the hydrocarbons is withdrawn through conduit 13, passed through heat exchanger 7 to precool effluent in line 4, and introduced through valve 13A and conduit 14 into fractionator 15, valve 13B being closed. The overhead from fractionator 15 including some hydrocarbons and hydrogen chloride and the bulk of the sulfur dioxide passes from conduit 16 into conduit 10 for reflux in the reaction zone. If the character of the hydrocarbons being isomerized is such that an azeotropic mixture is not formed with the sulfur dioxide, the refrigeration and separation steps may be omitted and valves 4A and 4B adjusted so that effluent from line 4 passes directly through line 14 to fractionator 15, valves 13A and 13B being closed. Where the formation of an azeotrope or the relative volatilities of the components allow a substantially complete separation of sulfur dioxide from hydrocarbon by fractionation, the bottom product from fractionator 15 including the isomerization yield is passed directly through conduit 21, valve 16, conduit 17 and conduit 34 into fractionator 35 for the recovery of isomerized product in a manner hereinafter described.

In the absence of complete separation of sulfur dioxide from hydrocarbon by fractionation, however, the bottom effluent from fractionator 15 is passed through valve 22 and conduits 21 and 13 to extractor 20, where residual sulfur dioxide and hydrochloric acid are removed from the effluent by a suitable selective solvent introduced through conduit 23 from stripper 24. Fresh solvent is introduced through line 25 and valve 26 as needed. The absorbed sulfur dioxide and hydrochloric acid are passed along with the solvent to stripper 24, separated therein from the solvent, and passed through conduit 27 either to the liquid reaction mixture through line 28 and valve 29 as a solvent for the aluminum chloride or through valve 30 and conduit 12 as a reflux for the reaction zone and absorbent for aluminum chloride vapors in a manner previously described.

The overhead from extractor 20 passes through conduit 31 to depropanizer 32 wherein propane is removed from the system through conduit 33 and the bottom product introduced into fractionator 35 through conduit 34 and valve 34A. The isomerized hydrocarbon product is recovered overhead through conduit 41 and the corresponding unconverted straight chain hydrocarbon either combined with the feed in conduit 1 through conduit 36 and valve 37 or conveyed to the reaction zone as a reflux through the conduit 42 and valve 43.

It is obvious from the foregoing that the use of sulfur dioxide permits the liquid-phase separation of a hydrocarbon-rich phase in separator 9 facilitating direct recovery of the major portion of the hydrocarbon in fractionator 15 and eliminating the solvent extraction and depropanizing steps. Where the hydrocarbon being converted, however, is such as not to allow this manner of separation the condensed effluent from line 4 is preferably introduced directly into fractionator 15 through conduit 13, valve 13A and conduit 14.

A further modification of the process resides in conveying the isomer-containing effluent from the separator 9 to the extractor 20 through conduit 13, valves 13A and 13B being open. In this manner a fairly efficient separation of the hydrocarbon product is obtained without resorting to fractional distillation in fractionator 15.

It is also feasible in some instances to obtain a separation of the sulfur dioxide and hydrochloric acid promoter from the effluent directly by extraction and thus eliminating both the liquid-phase separation and fractional distillation steps. This is accomplished by directing the effluent from conduit 4 through conduit 38 to extractor 20 by opening valve 39 and closing valve 40. The sulfur dioxide and hydrochloric acid are returned to the reaction zone through conduit 27 and the isomerized product recovered from fractionator 35 as previously described.

In the isomerization of butane to isobutane, a solution of aluminum chloride in liquid sulfur dioxide, butane and hydrogen chloride promoter is introduced into reactor 3 after being preheated to a temperature of from 190° to 210° F. The pressure in reactor 3 is maintained from 190 to 500 pounds per square inch to cause catalytic isomerization to proceed. A reflux of sulfur dioxide is furnished the upper portion of the column through lines 10 and 27 connecting respectively with the separator 9 and stripper 24. Catalytic isomerization of butane to isobutane proceeds in the reactor while vapors of aluminum chloride are absorbed in the liquid sulfur dioxide reflux. The overhead effluent is taken through line 4, condensed in 5 and refrigerated to a temperature of less than 23° F. in 8 to permit stratification in separator 9. The phase rich in sulfur dioxide settles to the bottom and is returned to the reactor as reflux through line 10. The layer rich in butanes is removed through line 13, valves 13A and 13B and introduced into extractor 20. Sulfur dioxide and hydrochloric acid separated in the stripper 24 are returned to the reactor as reflux through line 27, and the effluent hydrocarbons from extractor 20 are passed through the depropanizer 32 and into fractionator 35 for the recovery of substantially pure isobutane. Normal butane is returned to the feed stream through line 36.

The advantages of the process are obvious from the foregoing, and various modifications are possible within the scope of the appended claim:

I claim:

A process for the isomerization of normal butane to produce isobutane which comprises subjecting a reaction mixture comprising hydrogen chloride, liquid normal butane, and a solution of aluminum chloride in liquid sulfur dioxide, to conditions of temperature and pressure such as to isomerize normal butane to isobutane and such as to evolve vapors of sulfur dioxide and iso- and normal butane in azeotropic proportions together with vapors of hydrogen chloride and of aluminum chloride, passing said vapors upwardly in contact with a liquid sulfur dioxide reflux obtained as hereinafter described to effect complete solution of said aluminum chloride vapors therein, flowing said reflux containing dissolved aluminum chloride downwardly into said reaction mixture, condensing and cooling resulting aluminum chloride-free vapors to form two liquid layers, namely a sulfur dioxide-rich layer and a butane-rich layer, returning said sulfur dioxide-rich layer as said reflux to contact with said vapors, fractionally distilling said butane-rich layer to recover most of the hydrogen chloride and sulfur dioxide therefrom as an overhead fraction and to recover isobutane and normal butane as a higher-boiling fraction, returning said overhead fraction to said reaction mixture, subjecting said higher-boiling fraction to extraction with a solvent selective for hydrogen chloride and sulfur dioxide to remove therefrom residual hydrogen chloride and sulfur dioxide, stripping resulting rich solvent to recover hydrogen chloride and sulfur dioxide and returning same to said reaction mixture, and recovering isobutane from the thus-extracted higher-boiling fraction.

JOHN W. LOY.